Aug. 3, 1965      P. P. LIFLAND      3,198,727
QUASI-ISOTHERMAL HYDROCARBON CONVERSION AND REACTOR THEREFOR
Filed May 25, 1960      3 Sheets-Sheet 1

INVENTOR.
Philip P. Lifland
BY
Agent

Aug. 3, 1965 P. P. LIFLAND 3,198,727
QUASI-ISOTHERMAL HYDROCARBON CONVERSION AND REACTOR THEREFOR
Filed May 25, 1960 3 Sheets-Sheet 2

FIG. 5

INVENTOR.
Philip P. Lifland
BY Frances Johnston
Agent

FIG. 7

United States Patent Office 3,198,727
Patented Aug. 3, 1965

3,198,727
QUASI-ISOTHERMAL HYDROCARBON CONVERSION AND REACTOR THEREFOR
Philip P. Lifland, Woodbury, N.J., assignor to Socony Mobil Oil Company, Inc., a corporation of New York
Filed May 25, 1960, Ser. No. 31,721
8 Claims. (Cl. 208—65)

The present invention relates to hydrocarbon conversions and, more particularly, to hydrocarbon conversions carried out under quasi-isothermal conditions.

As those skilled in the art know every hydrocarbon conversion is either an exothermic reaction or an endothermic reaction. Exemplary of exothermic hydrocarbon conversions are the catalytic hydrocracking of naphthas and heavier petroleum fractions and the hydrogenation of naphthas and other petroleum fractions. Exemplary of endothermic hydrocarbon conversions are the catalytic cracking of gas oil and the dehydrogenation of naphthenes. Those skilled in the art also recognize that improved results can be obtained when the reaction conditions are isothermal, i.e., the reaction temperature throughout the bed of catalyst is substantially constant. For reaction conditions to be ideally isothermal it is necessary to remove heat from an exothermic reaction and supply heat to an endothermic reaction substantially as rapidly as produced or consumed. However, no one has succeeded in achieving the ideal isothermal reaction conditions except on small laboratory equipment. On the other hand, many attempts have been made to approach as closely as practically possible isothermal reaction conditions in a unit of industrial size. All of the attempts to approach isothermal reaction conditions on an industrial scale have involved the use of indirect or direct heat transfer between the reactants and a fluid heat transfer medium.

Thus, for example, in U.S. Patent No. 2,306,011 in Burk et al. disclose a reactor in which a plurality of spaced apart catalyst trays having grids of heat conducting material therein are provided and coils are placed intermediate the catalyst beds. The flames from fluid fuel and combustion gas flow through the coils providing indirect heat transfer relation between the flames and hot gases and the fluid reactant. In U.S. Patent No. 2,271,646 Kassel discloses a reactor in which after passing through each catalyst bed the fluid reactant stream flows to an external heater where the fluid reactant stream is reheated to reaction temperature. In U.S. Patent No. 2,299,197 West describes a reactor provided with a plurality of spaced apart catalyst beds having coils between the catalyst beds. Fluid heat transfer medium flows through the coils providing indirect heat transfer between the fluid heat transfer medium and the fluid reactant. In U.S. Patent No. 2,349,045 Layng et al. disclose an elongated reactor into which hot gases are injected at various points along the long axis. Other patents disclosing similar means for indirect heat transfer from a fluid heat transfer medium to a fluid reactant stream are U.S. Patents Nos. 1,747,634; 1,915,363; 2,366,567; and 2,319,620. As the patentees state in U.S. Patent No. 2,654,694: "However, isothermal systems require elaborate and costly reactor designs to provide for heat exchange and they require heat transfer mediums such as flue gases or molten salts as well as heating means, hence we prefer to use the more economical adiabatic systems." On the other hand, it has now been discovered that isothermal, or probably more correctly, quasi-isothermal, reaction conditions can be provided at the site of the reaction without indirect heat exchange between fluid heat transfer media such as flue gases or molten salts and the fluid reactant or the particles of a static catalyst bed.

Since isothermal conditions connotates constant temperature and since the temperature of the fluid reactant stream leaving a catalyst bed is different from that of the fluid reactant stream entering the same catalyst bed, the method of catalytic hydroconversion of the present invention is not a strictly isothermal method but rather a method which approximates an isothermal method of catalytic hydrocarbon conversion, it has been designated a quasi-isothermal method of catalytic conversion. Accordingly, it is an object of the present invention to provide a quasi-isothermal method of catalytic hydrocarbon conversion involving either exothermic or endothermic reactions in which a fluid stream containing at least one reactable component is contacted with particle-form solid hydrocarbon conversion catalytic material in a plurality of static beds in each of which the catalyst-to-reactable component ratio is regulated to provide in all of said beds a substantially equal small change of temperature between the temperature of the fluid stream entering the static bed of catalytic material and the temperature of the fluid stream leaving the same bed of static catalytic material, in which the fluid stream is in direct heat exchange relation with stationary solid heat exchange medium between successive static catalyst beds and in which the coefficient of heat transfer of the stationary solid heat transfer medium and the area thereof in direct contact with the fluid stream and the amount of the fluid stream are regulated to bring the temperature of the fluid stream back substantially to that at which it entered the preceding static bed catalyst. It is another object of the present invention to provide a reactor in which in a plurality of vertical reaction tubes a plurality of static beds of particle-form solid hydrocarbon conversion catalytic material are mounted, the volume of each of said plurality of static beds being proportioned to the concentration of reactable hydrocarbon in the fluid stream contacted to provide a substantially equal and small change in temperature between the fluid stream inlet temperature and the fluid stream outlet temperature of each of said beds. It is a further object of the present invention to provide a method of catalytic hydrocarbon conversion wherein the temperature of the fluid stream entering a reactor and the temperature of the fluid stream leaving the reactor differ by only a small amount not greater than about ten degrees Fahrenheit in the reaction temperature range of about 800° to about 1000° F. It is also within the scope of the present invention to provide a reaction tube having at one end a vapor inlet and at the other end a vapor outlet and having mounted therewithin a plurality of spaced apart metallic grids, including lead, intermediate and tail grids, preferably of honeycomb design, each of said grids having mounted on the vapor inlet side thereof a partition pervious to fluids but substantially impervious to particles of solid hydrocarbon conversion catalytic material, and having in contact with gases or vapors passing through said reaction tube equal surface area of contact, said lead grid being disposed a finite distance from the vapor inlet of said reaction tube, said tail grid being disposed a finite distance from the vapor outlet of said reaction tube, and the distance between said grids increasing from said lead grid to said tail grid to provide between the lead grid and the aforesaid vapor inlet a reaction chamber containing an amount of catalyst to provide a small but finite reaction temperature change of at least about 5° F. and not greater than about 50° F. and between successive grids and between the tail grid and the vapor outlet of said reaction tube reaction chambers each containing an amount of catalyst to provide a reaction temperature change substantially equal to the reaction temperature change in the reaction chamber preceding the aforesaid lead grid. The present invention also provides for a reaction tube for dehydrogenating naphthenes comprising a cylindrical container having a vapor inlet at one end and a vapor outlet at the other end, a plurality of spaced apart stationary heat transfer grids comprising a lead grid, a tail grid, and intermediate grids, each grid consisting of solid heat transfer medium, said lead grid being disposed within said reaction tube a small but finite distance from said vapor inlet, said tail grid being disposed from said vapor outlet, the distance between each successive grid increasing from the lead grid to the tail grid, the distance between the tail grid and the aforesaid vapor outlet being the greatest, and the spaces between the vapor inlet and the lead grid, the space between the tail grid and the vapor outlet, and the space between successive grids being reaction chambers containing an amount of particle-form solid reforming catalyst having capability to dehydrogenate napthenes producing a 5 to 50, preferably about 10, degrees Fahrenheit change in the temperature of fluid stream containing at least one naphthene between the temperature of the fluid stream entering a bed of catalyst and the temperature of the fluid stream leaving the same bed of catalyst, and each of said grids having a surface area to transfer heat from the reaction tube wall to the fluid stream to raise the temperature of the fluid stream in contact therewith to the temperature at which said fluid stream entered the preceding catalyst bed. The present invention also provides a quasi-isothermal reactor for hydrocarbon conversion which comprises a cylindrical container, a source of fluid heat transfer medium within said container, a plurality of vertical reaction tubes disposed within said container in a plurality of circles concentric with the aforesaid source of fluid heat transfer medium, the vertical reaction tubes in the outer of said concentric circles being adjacent the wall of the aforesaid container, none of said vertical reaction tubes in the inner circles being interposed substantially between the aforesaid source of fluid heat transfer medium and another vertical reaction tube, inlet means for introducing fluid stream containing at least one reactable component into each vertical reaction tube, outlet means for withdrawing fluid stream from each vertical reaction tube, a plurality, consisting of a lead, a tail, and intermediate, of spaced apart stationary heat transfer means, consisting of solid heat transfer medium, movably mounted in each of the aforesaid vertical reaction tubes, said lead stationary heat transfer means being spaced apart from said inlet means, and said tail stationary heat transfer means being spaced apart from said outlet means, all of said stationary heat transfer means being in direct heat transfer relation with the contiguous inner periphery of a vertical reaction tube, each of said stationary heat transfer means having substantially the same area of heat transfer surface for contact with the aforesaid fluid stream in direct heat transfer relation, the space between successive stationary heat transfer means increasing from said lead stationary heat transfer means to said tail stationary heat transfer means, and the greatest space being between the aforesaid tail stationary heat transfer means and the aforesaid outlet means, the space between the aforesaid lead stationary heat transfer means and said inlet means, the space between successive stationary heat transfer means, and the space between said tail stationary heat transfer means and the aforesaid outlet forming catalyst zones of increasing capacity for particle-form solid hydrocarbon conversion catalytic material wherein reaction of the aforesaid reactable component takes place to require transfer of substantially the same amount of heat energy between successive catalyst zones between said fluid stream and said stationary heat transfer means, a fluid stream pervious but catalyst particle retaining partition mounted horizontally on the lead side of each stationary heat transfer means, and means mounted on the lead side of each stationary heat transfer means adapted to facilitate removing said stationary heat transfer means from said vertical reaction tube.

In accordance with the principles of the present invention a fluid stream containing at least one reactable component is contacted successively with particle-form solid hydrocarbon conversion catalytic material as a static bed and stationary heat transfer means until the fluid stream leaving the tail catalyst bed is substantially devoid, i.e., contains not more than about fifteen percent of the original amount of the aforesaid reactable component. The amount of catalyst in each static bed of particle-form solid hydrocarbon conversion catalytic material is proportioned to the amount of reactable component in the fluid stream that the difference between the temperature of the fluid stream entering a static bed of catalyst and the temperature of the fluid stream leaving the same static bed of catalyst is substantially the same. Each of the stationary heat transfer means is constructed and arranged to provide substantially the same area of direct contact with the fluid stream to provide transfer of substantially the same amount of heat between the fluid stream and the stationary heat transfer means. Each stationary heat transfer means is constructed and arranged for direct heat transfer relation between the stationary heat transfer means and the contiguous area of the reaction tube. The reaction tube is in direct heat exchange relation with fluid heat transfer medium on the outer periphery of each reaction tube at least in the area in which the inner periphery of each reaction tube is in direct contact with the aforesaid stationary heat transfer means. The difference in temperature between the fluid stream entering a reaction tube and the temperature of the fluid stream leaving a reaction tube is not more than about 50 degrees Fahrenheit and preferably about 5 to about 20 degrees Fahrenheit.

The temperature of the fluid stream or the fluid reactant mixture is held within a fixed constant temperature differential of the desired reaction temperature without the use of extraneous heat transfer media such as molten mixtures of inorganic salts. Consequently, means for contacting heat transfer medium and the fluid reactant mixture is eliminated together with the complexity of prior art design and cost of fabrication and maintenance.

In general, the present quasi-isothermal reactor is suitable for all endothermic or exothermic reactions taking place in the presence of particle-form solid catalytic material wherein one or more fluid reactants participate. Broadly, the quasi-isothermal reactor for endothermic reactions comprises a plurality of tubes mounted in a direct fired furnace wherein preferably the tubes are heated primarily by radiant heat and secondarily by convection, the depth of each bed providing a selected substantially constant temperature drop between the inlet side of each bed and the outlet side of the same bed. The heating chamber between successive beds being of such linear dimensions and provided with a removable stationary heat conducting grid that fluid reactant mixture is reheated to the temperature at which the fluid reactant mixture entered the first catalyst bed in the series.

Dependent upon the rate at which the reaction progresses the depth of the individual beds of particle-form solid catalytic material is regulated to provide a substantially constant temperature differential between the temperature of the fluid reactant mixture entering a catalyst bed and the temperature of the fluid reactant mixture leaving that catalyst bed. Dependent upon the reaction taking place the depth of the catalyst bed can be regulated to provide substantially constant temperature differentials of about 5 to about 50 degrees Fahrenheit, preferably about 5 to about 20 degrees Fahrenheit between the temperature of the fluid reactant mixture entering and leaving a minor reaction bed. As a consequence the temperature differential between the temperature of the fluid stream, i.e., the fluid reactant mixture, entering and leaving a reaction tube is not greater than the temperature differential in a minor catalyst bed.

Illustrative of the present quasi-isothermal reactor is that illustrated in FIGURES 1 through 7. The reactor illustrated in FIGURES 1 through 7 is particularly adapted to carrying out endothermic reactions such as the dehydrogenation of naphthenes.

Figures 1, 2, 3, 4, 6:
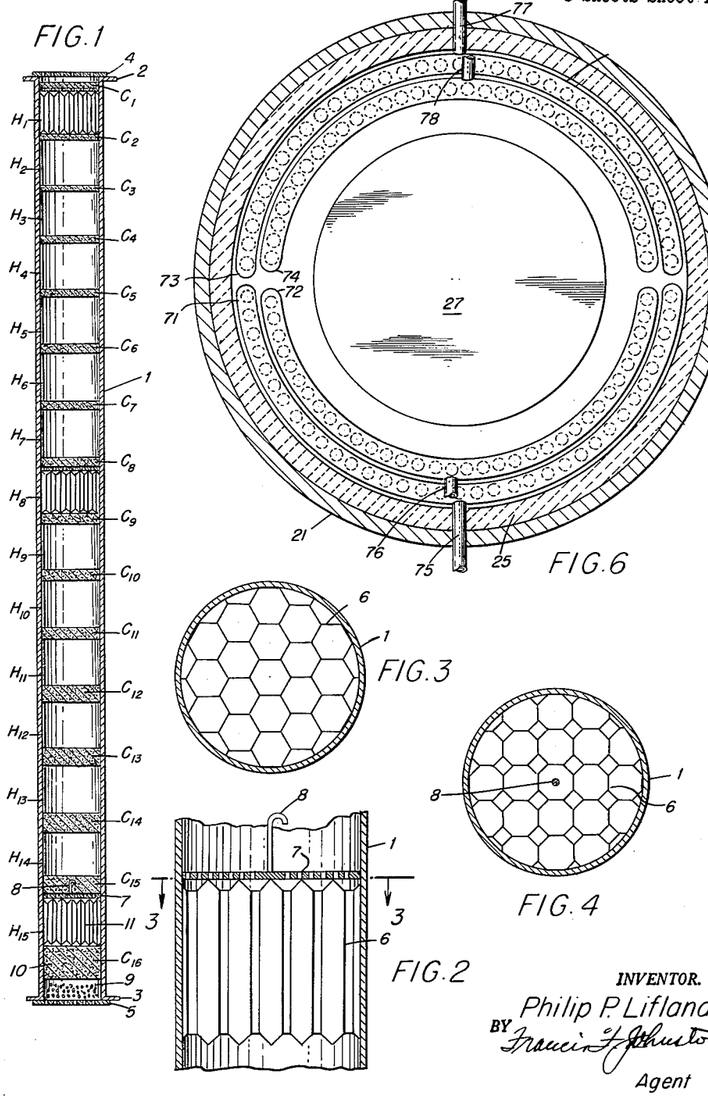
FIGURE 1 is a vertical section of a single reaction tube adapted for use in an endothermic reaction showing a plurality of 16 catalyst beds, and a plurality of 15 stationary heat transfer means. The catalyst beds illustrated in FIGURE 1 are of increasing depth from the lead catalyst bed $C_1$ to the tail catalyst bed $C_{16}$.
FIGURE 2 is a vertical section of the preferred form of the stationary heat transfer means showing the fluid stream pervious partition and a means adapted to facilitate removing the stationary heat transfer means from the reaction tube.
FIGURE 3 is a horizontal section of the preferred form of the stationary heat transfer means taken on line 3—3 of FIGURE 2.
FIGURE 4 is a plan view of another form of stationary heat transfer means.
FIGURE 6 is a plan view of the reactor illustrated in FIGURE 5 taken at line 6—6 showing the inlet manifolds.

FIGURE 1 is a vertical section of a reaction tube having a plurality, sixteen illustrated, of catalyst beds or reaction zones and a plurality of reheat zones, fifteen illustrated, each occupied by a stationary heat transfer means in direct heat exchange relation with the inner periphery of the wall of the aforesaid reaction tube and in direct heat exchange relation with the fluid stream flowing from one catalyst bed or reaction zone to the succeeding catalyst bed or reaction zone. It will be observed that the catalyst beds or reaction zones increase in depth from the lead catalyst bed or reaction zone $C_1$ to the tail catalyst bed or reaction zone $C_{16}$. It will also be observed that the reheat zones and the contained stationary heat transfer medium have the same depth. Hence, each stationary heat transfer means presents substantially the same area of contact to the flowing stream of fluid.

The reaction tube 1 is fabricated of any suitable material which remains substantially unchanged physically and preferably chemically under reaction conditions. The reaction tube is provided with a flange 2 at the vapor inlet end and a flange 3 at the vapor outlet thereof. Provision is made to mount a vapor distributing partition 4 on the vapor inlet flange and a vapor-solids separator partition 5 on the vapor outlet flange. The reaction tube is charged with a plurality of stationary heat transfer means and with particle-form solid hydrocarbon conversion catalytic material in the following manner.

By reference to FIGURES 2, 3 and 4 it will be observed that each stationary heat transfer means 6 is designed to offer the minimum resistance to the passage of fluid while providing the maximum surface area of contact with the fluid stream flowing from one reaction zone to the next. The preferred heat transfer means is a honeycomb or hexagonal prismatic form having the free surface horizontal and the long axis vertical. On the vapor inlet or lead side of the stationary heat transfer means a fluid pervious partition 7 preventing the passage of the preponderant portion of the particles of catalytic material is rigidly mounted. On the lead side of the fluid pervious partition 7 (FIGURE 2) a means 8 for facilitating removing the stationary heat transfer means from the reaction tube is provided. In its simplest form the means for removing the stationary heat transfer means is a bar or rod bent in a U-shape or to form a hook which can be engaged by a suitable fishing tool such as an eye or hook on a shaft of suitable length.

The reaction tube is assembled by mounting vapor-solids separator or partition 5 (FIGURES 1 and 5) between flange 3 of the reaction tube and flange 57 of the flanged section 49. A bed 9 of particles of material inert with respect to the environment is deposited on vapor-solids separator or partition 5. A bed 10 of particles of hydrocarbon conversion catalytic material is superposed on the bed of particles of inert material. A stationary heat transfer means 11, preferably the honeycomb structure illustrated in FIGURES 2 and 3, is placed upon the upper surface of the aforesaid bed 10 of particles of catalytic material. (These are respectively catalyst bed $C_{16}$ and stationary heat transfer means $H_{15}$.) In a similar manner catalyst bed $C_{15}$ is disposed on stationary heat transfer means 11; stationary heat transfer means $H_{14}$ is deposited on catalyst bed $C_{15}$. Similarly, stationary heat transfer means $H_{13}$ through $H_1$ and catalyst beds $C_{14}$ through $C_1$ are placed in reaction tube 1. Vapor distributing partition 4 is then mounted between flange 2 and flange 46 of flanged section 41.

For a reaction tube to be used in a reactor wherein the dehydrogenation of naphthenes takes place the volume of catalyst in each of the beds $C_1$ through $C_{16}$ is related to the volume of catalyst in the lead bed by the equation $$(1) \quad W = \frac{LK_pN_tC_p\Delta T}{K_fP_n\left[K_p - \frac{(P_aP_{H_2}^3)}{P_n}\right]H_R}$$

where:

$L$ = mols fresh feed per hour;
$K_p$ = equilibrium constant for naphthene⇌aromatic equilibrium in atmospheres to the third power (atm.³);
$K_f$ = rate constant for naphthene dehydrogenation $$\frac{\text{mols}}{(\text{hour}) (\text{lb. catalyst}) (\text{atm.})}$$

$N_t$ = total mols per mol fresh feed = recycle ratio + 1;
$P_n$ = partial pressure of naphthenes, atmospheres;
$P_a$ = partial pressure of aromatics, atmospheres;
$P_{H_2}$ = partial pressure of hydrogen, atmospheres;
$H_r$ = heat of reaction, B.t.u. per pound mol of naphthenes;
$C_p$ = molar heat capacity, B.t.u. per pound mol, per ° F.;
$W$ = pounds of catalyst in catalyst section;
$\Delta T$ = decrease in temperature in section, ° F.

Since the $\Delta T$ for each catalyst section is predetermined, this predetermined value for $\Delta T$ together with the average composition of fluid entering each section are substituted in Equation 1 and the equation solved for $W$, the weight of catalyst required in the section. The area of the reactor tube needed to reheat the fluid effluent from each static bed of catalyst to the temperature at which the fluid enters the next static bed of catalyst is derived from Equation 2.

(2) $A$ = outside area of tube section containing honeycomb solid heat transfer grid =

$$\frac{LC_p\Delta T}{Q}$$

where $Q$ = heat flux to tube section in contact with honeycomb, $$\frac{\text{B.t.u.}}{\text{Hr. Ft.}^2}$$

Thus, for dehydrogenating the naphthenes in a naphtha charge comprising the 180° to 380° F. E.P. fraction Mid-Continent straight run naphtha having the following compositions:

| | |
|---|---:|
| Paraffins ______________percent by volume__ | 47 |
| Naphthenes ____________________________do____ | 44 |
| Aromatics _____________________________do____ | 7 |
| Other _________________________________do____ | 2 |
| Specific gravity _______________________________ | 0.7555 |
| Molecular weight ______________________________ | 117 |

Under the following reaction conditions:

| | |
|---|---:|
| Total pressure, p.s.i.g. _________________________ | 500 |
| Average temperature, ° F. _____________________ | 960 |
| Temperature decrease in each catalyst bed, ° F. ___ | 10 |
| Hydrogen-to-naphtha mol ratio _________________ | 10:1 |
| Concentration of hydrogen in recycle gas, percent by volume ___________________________________ | 75 |

The constants for Equations 1 and 2 are as follows:

$L$ = 935 mols/hour (equivalent to 10,000 b./d.)
$K_p$ = 0.25 atm.$^3$
$K_f$ = 963,000 mols/hr. lb. cat. atm.
$N_t$ = 14.3
$P_n$ = 1.18
$P_a$ = 0.25
$P_{H_2}$ = 24.5
$H_t$ = 91,500 B.t.u./mol
$C_p$ = 20 B.t.u./mol ° F.
$Q$ = 20,000 B.t.u./hr. Ft.$^2$
$\Delta T$ = 10° F.

A further description of these quantities and the method for calculating changes in composition in each bed can be found in the article entitled "Kinetic Analysis of Naphtha Reforming with Platinum Catalyst," R. B. Smith, Chem. Eng. Prog., vol. 55, No. 6, page 76 (June 1959).

The values of $P_n$, $P_a$ and $P_{H_2}$ vary from the inlet of the reactor tube to the outlet thereof within the magnitudes set forth hereinafter.

|  | Inlet to Catalyst Bed $C_1$, atm. | Inlet to Catalyst Bed $C_{16}$, atm. |
|---|---|---|
| $P_n$ | 1.18 | 0.1 |
| $P_a$ | 0.25 | 1.2 |
| $P_{H_2}$ | 24.5 | 25.3 |

Employing the foregoing Equations 1 and 2 it can be calculated that a "quasi-isothermal" reactor of the present invention will require 100 tubes four inches inside diameter 17.9 feet long to treat 10,000 barrels per day of the aforedescribed fraction of Mid-Continent naptha under the aforestated conditions. Furthermore, each reactor tube is provided with sixteen static beds of catalyst and fifteen heat transfer grids. The dimensions of each static bed of catalyst and each stationary, solid heat transfer medium grid are as follows:

| Catalyst Bed No. | Cu. Ft. of Catalyst | 100 Tubes 4 Inches I.D., 4½ Inches O.D. for 10,000 b./d. | |
|---|---|---|---|
|  |  | Height of Bed, Inches | Pounds of Catalyst |
| $C_1$ | 0.0137 | 1.88 | 0.59 |
| $C_2$ | 0.0144 | 1.98 | 0.62 |
| $C_3$ | 0.0153 | 2.10 | 0.66 |
| $C_4$ | 0.0162 | 2.23 | 0.70 |
| $C_5$ | 0.0174 | 2.39 | 0.75 |
| $C_6$ | 0.0186 | 2.56 | 0.80 |
| $C_7$ | 0.0200 | 2.75 | 0.86 |
| $C_8$ | 0.0216 | 2.97 | 0.93 |
| $C_9$ | 0.0237 | 3.26 | 1.02 |
| $C_{10}$ | 0.0260 | 3.58 | 1.12 |
| $C_{11}$ | 0.0290 | 3.99 | 1.25 |
| $C_{12}$ | 0.0327 | 4.50 | 1.41 |
| $C_{13}$ | 0.0376 | 5.17 | 1.62 |
| $C_{14}$ | 0.0431 | 6.06 | 1.90 |
| $C_{15}$ | 0.0529 | 7.27 | 2.28 |
| $C_{16}$ | 0.0663 | 9.12 | 2.86 |

The reheat sections are 10.2 inches long. The solid heat transfer medium grids each have a surface area of contact with the fluid reactant of about 500 to 3,000 square inches. Since the cross-section of the reaction tube 1 is substantially constant, the depths of the static beds of catalyst are in proportion to the weight of catalyst in the static beds.

The depth of the stationary heat transfer means is readily determined from Equation 2 and the tube outside surface area per unit length of stationary heat transfer medium.

Figure 5:
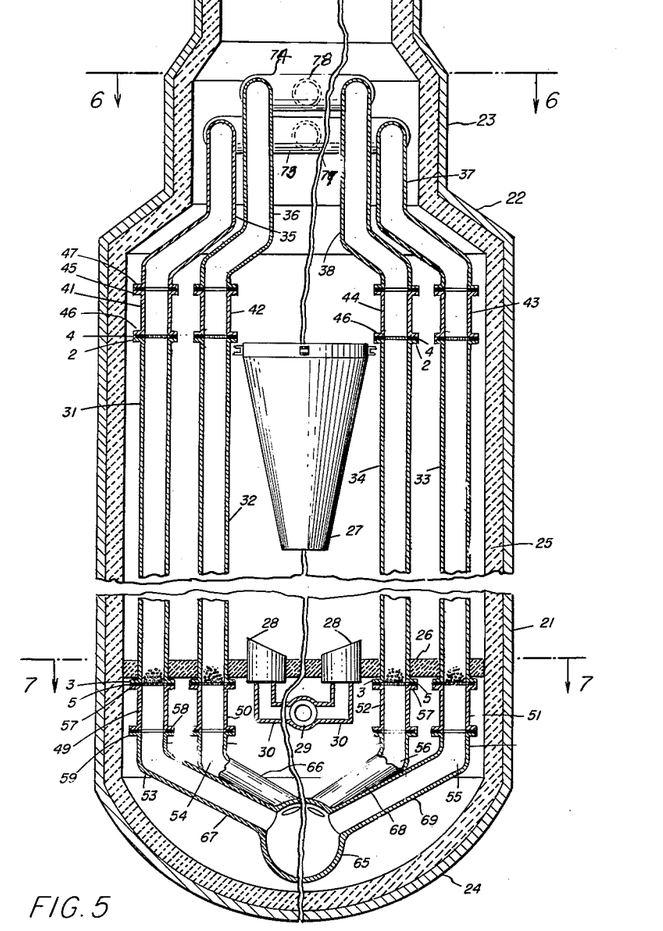
FIGURE 5 is a vertical section of a reactor suitable for carrying out endothermic reactions.

Each of the plurality of reaction tubes of which four, 31, 32, 33, and 34 are shown in FIGURE 5 are duplicates of reaction tube 1 in FIGURE 1 with respect to catalyst distribution and spatial disposition of catalyst beds and interposed stationary heat transfer means.

Figure 7:
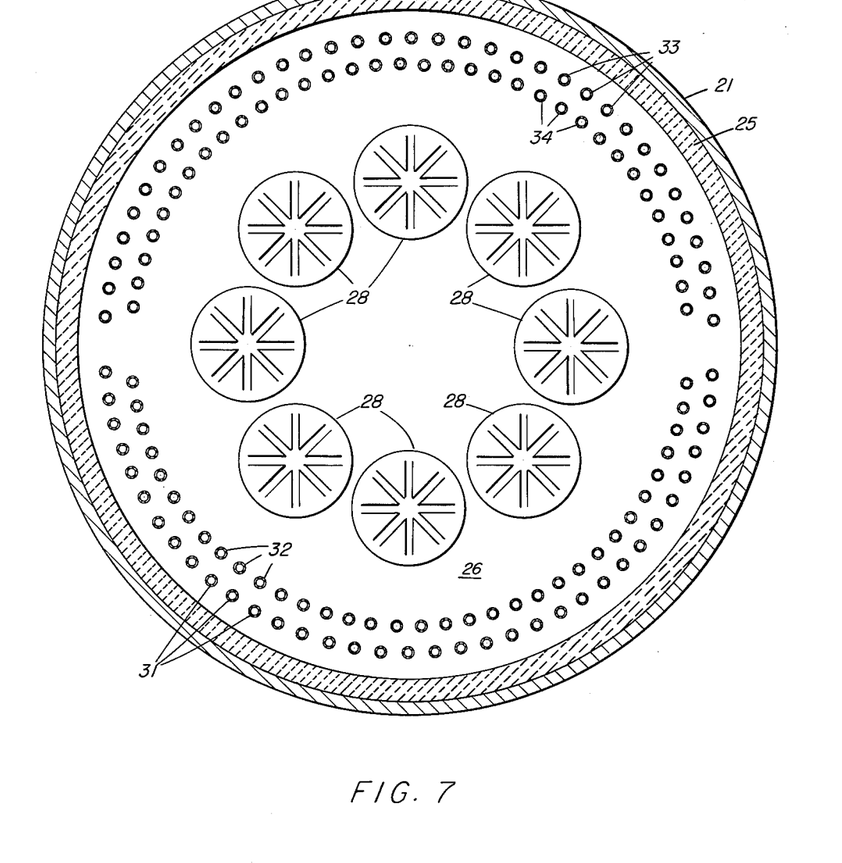
FIGURE 7 is a horizontal cross-section of the reactor illustrated in FIGURE 5 taken at line 7—7.

Illustrative of a suitable quasi-isothermal reaction having reaction tubes such as described hereinbefore is the reactor illustrated in FIGURES 5, 6 and 7. The reactor comprises a shell 21 of structural material such as low carbon steel having a shoulder 22 and a throat 23. The reactor is preferably cylindrical in shape and preferably has an elliptical or hemispherical bottom 24. Preferably, the reactor is lined throughout with a layer of insulating material 25 such as insulating concrete applied by "gunning" the concrete on the inner periphery of the reactor.

A heat resistant floor or hearth 26 is mounted in any suitable manner in the lower part of the reactor while a radiant heat baffle 27, preferably cone-shaped, is mounted in any suitable manner concentric with the vertical axis of the reactor with the base thereof slightly below the horizontal plane of flange 2 of the reaction tubes. Cone 27 serves to deflect the rays of radiant heat emanating from burners 28.

Burners are the so-called radiant heat type usually six or eight, more or less, mounted concentrically about the vertical axis of the reactor (FIGURE 7) on floor or hearth 26 of the reactor. Liquid or gaseous fuel, i.e., fluid fuel flows to manifold 29 and thence through a plurality of fuel manifold branches 30 (one for each burner) to burners 28. Suitable flow control means not shown are provided to regulate the amount of fuel burned per unit of time and thereby regulate the amount of heat.

A plurality of reaction tubes is mounted in circles concentric with the vertical axis with the outer circle adjacent the wall of the reactor and the innermost or inner circle spaced from the burners. The reaction tubes of the inner circle(s) are so disposed that no reaction tube in an inner circle is substantially interposed between the source of radiant heat, i.e., fluid heat transfer medium and a reaction tube in the outer circle(s). In other words, no reaction tube is masked by a reaction tube in a circle closer to the source of fluid heat transfer medium.

A plurality of reaction tubes of which four are shown, 31, 32, 33 and 34 are mounted in any suitable manner with the lower or outlet flange 3 below the hearth or floor 26 and the upper or inlet flange 2 slightly above the horizontal plane in which the base of deflector cone 27 lies.

The number of reaction tubes is dependent upon the space velocity employed and the diameter of the reaction tubes to provide a reaction tube of practical height for heating predominantly by radiant heat and secondarily by convection. Preferably, the reaction tubes are about 2 to 8 inches in diameter.

The fluid stream containing at least one reactable component, in the illustrative case at least one naphthene capable of dehydrogenating in the presence of particleform dehydrogenating catalyst such as platinum-group metal on an alumina support, chromium oxide-aluminum oxide, i.e., chrome-alumina reforming catalyst, molybdenum oxide on alumina or other dehydrogenating catalyst, flows through inlet main 75 and 77 (FIGURE 6) to "half-doughnut" inlet manifolds 71 and 73 and through inlet mains 76 and 78 to "half-doughnut" inlet manifolds 72 and 74. Inlet manifolds 71 and 73 serve the reaction tubes of the outer circle, i.e., 31, 33, and others not shown while inlet manifolds 72 and 74 serve the reaction tubes of the inner circle, i.e., 32, 34, and others not shown. "Half-doughnut" inlet manifolds 71 and 73 are provided with a manifold branch for each reaction tube in the outer circle. Two manifold branches 35 and 37 connecting "half-doughnut" inlet manifold 71 to reaction tubes 31 and 33 respectively are shown. "Half-doughnut" inlet manifold 72 is provided with a plurality of manifold branches, one for each reaction tube in the inner circle. Two of these manifold branches 36 and 38 are shown connecting "half-doughnut" inlet manifold 72 to reaction tubes 32 and 34 in the inner circle.

The inlet manifold branches, e.g., 35, 36, 37 and 38 (FIGURE 5) are joined to the respective reaction tubes, e.g., 31, 32, 33, and 34 by flanged sections 41, 42, 43, and 44 respectively. Each flanged section is provided with an upper flange 45 and a lower flange 46. The upper flange 45 is complementary to a flange 47 on the mating end of the manifold branch. The lower flange 46 is complementary to the upper flange 2 of the reaction tubes. The flanged sections are joined to the respective manifold branch and reaction tube in the usual manner by nuts and bolts. Alternatively, the flanged section can have only a lower flange 46, the manifold branch can have no flange and the flanged section can be welded to the manifold branch.

As described hereinbefore each reaction tube has at the vapor outlet end a flange 3. Each reaction tube is connected through a flanged section 49, 50, 51, and 52 (shown) to a vapor outlet manifold. The reaction tubes in the outer circle are connected through flanged sections 49 and 51 to outlet header branches 53 and 55. The reaction tubes in the inner circle are connected through flanged sections 50 and 52 to outlet header branches 54 and 56. While the flanged sections 49, 50, 51, and 52 can be welded to vapor outlet headers 53, 54, 55, and 56 it is preferred to provide the flanged sections with flanges at both ends so that the flanged sections can be readily removed. Accordingly, flanged sections 49, 50, 51, and 52 are provided with a flange 57, complementary to flange 5 of the reaction tube, to which the flanged section is attached after insertion of fluid pervious partition 7 by means of bolts and nuts in the usual manner. Similarly, the flanged section is provided at the branch end with a flange 58 complementary to flange 59 on the branches 53, 54, 55, and 56. The flanged sections are joined to the outlet header branches in the usual manner with nuts and bolts.

Each of the vapor outlet branches is connected to a vapor outlet main 65 by one or more pipes 66, 67, 68, and 69.

FIGURE 6 provides a cross-sectional view of reactor 21 taken at line 6—6. In FIGURE 6 are shown vapor inlet mains 75 and 77 serving respectively "half-doughnut" vapor inlet manifolds 71 and 73 which in turn serve the outer circle of reaction tubes. (Reaction tubes 31 and 33 being shown in FIGURE 5.) Vapor inlet mains 76 and 78 serve "half-doughnut" vapor inlet manifolds 72 and 74 which in turn serve the reaction tubes in the inner circle. (Reaction tubes 32 and 34 being shown in FIGURE 5).

Referring to FIGURES 5, 6, and 7, when using the quasi-isothermal reactor for an endothermic reaction, such as the dehydrogenation of naphthenes, a fluid fuel such as refinery gas, or a mixture of refinery gas and liquid hydrocarbons flows from a source not shown through fuel main 29 and branches 30 to burners 28. The fuel is burned at burners 28 to provide a luminous flame producing radiant heat which bathes the reaction tubes and raises the temperature of the walls of the reaction tubes to about 900° to about 1100° F. However, due to the low effective heat conductivity of beds of granular materials there is a substantial temperature gradient across a bed of catalytic material which is more than about one-eighth inch in diameter. However, the stationary heat transfer means, i.e., honeycombs $H_1$ through $H_{15}$ (FIGURE 1) are fabricated of material having a high coefficient of heat conductivity. Accordingly, when the walls of the reaction tubes have a temperature within the range of about 900° to about 1100° F. the heat transfer means $H_1$ to $H_{15}$ have a temperature of about 875° to about 1075° F.

Employing fresh dehydrogenating catalyst comprising about 0.6 percent by weight of platinum on an alumina support the naphthenes in a naphtha can be dehydrogenated at temperatures of about 850° to about 1050° F., preferably about 920° to about 980° F. Accordingly, when the temperatures of the stationary heat transfer grids $H_1$ to $H_{15}$ reach about 950° F. naphtha containing at least 15 percent by volume naphthenes and hydrogen-containing gas in the mol ratio of about 1:1 to 1:10 heated to about 950° F. temperature flows from a source not shown through inlet mains 75 and 77 to vapor inlet "half-doughnut" manifolds 71 and 73 and through inlet mains 76 and 78 to "half-doughnut" manifolds 72 and 74. From manifolds 71 and 73 the vapors flow through manifold branches 35 and 37 and others not shown to flanged sections 41 and 43 and others not shown to reaction tubes 31 and 33 and others not shown in the outer circle of reaction tubes in the quasi-isothermal reactor. The vapors flow from "half-doughnut" inlet manifolds 72 and 74 through branches 36 and 38 and others not shown to flanged sections 42 and 44 and others not shown to reaction tubes 32 and 34.

The naphthenes in the naphtha vapors are dehydrogenated in minor catalyst beds $C_1$ (FIGURE 1) to an extent producing a drop of about 10° F. in the temperature of the vapors passing through catalyst bed or reaction zone $C_1$. The vapors then contact the stationary heat transfer grid $H_1$ where through heat flowing through the high heat conducting material from which the grid is fabricated from the reaction tube walls the temperature of the vapors is raised to that at which they entered catalyst bed $C_1$, say 950° F. Similarly, in each of catalyst beds $C_2$ through $C_{15}$ (FIGURE 1) the temperature of the naphtha vapors drops about 10° F. during passage through each bed and is raised about 10° F. during contact with each heat transfer grid $H_2$ through $H_{15}$. The naphtha vapors enter catalyst bed $C_{16}$ at about the same temperature as that at which they entered catalyst bed $C_1$. The naphtha vapors containing not more than about 2 to about 25 percent of the naphthenes originally present in the naphtha feed leave catalyst bed $C_{16}$ at a temperature only about 10° F. lower than the temperature at which the vapors of the feed naphtha enter catalyst bed $C_1$. Thus, while the temperature of the fluid reactants has oscillated about 10° F. the reaction has been substantially isothermal or at least quasi-isothermal.

The vapors from each of the reaction tubes in the outer circle flow from the reaction tubes through the flanged sections 49 and 51 (FIGURE 5) to the flanged vapor outlet branches 53 and 55 and others not shown. From vapor outlet branches 53 and 55 the vapors from the reaction tubes in the outer circle flow through at least one pipe 67 and 69 to vapor outlet main 65. The vapors from the reaction tubes 32, 34, and others in the inner circle (not shown) flow through flanged sections 50 and 52 to vapor outlet branches 54 and 56 and others not shown. From vapor outlet branches 54 and 56 the vapors flow through at least one pipe 66 and 68 to vapor outlet main 65 where the vapors from the reaction tubes in the inner circle mix with the vapors from the reaction tubes in the other circle. The mixed vapors usually flow through main 65 to means for separating $C_4$ and heavier hydrocarbons from recycle gas comprising hydrogen and $C_1$ to $C_3$ hydrocarbons which is at least in part heated and recycled to the reaction tubes in reactor 21. The $C_4$ and heavier hydrocarbons are fractionated to provide gasoline of the required Reid vapor pressure and octane rating or further processed to produce gasoline of higher octane rating.

It is recognized that in reforming naphtha three or four reactions contribute to the rise in the octane rating of the naphthas. These reactions are dehydrogenation of naphthenes dehydrocyclization of paraffins, isomerization of paraffins, and hydrocracking of paraffins. Therefore, dependent upon the required or target octane of the reformate and the means whereby such octane is produced the effluent of the hereinbefore described "quasi-isothermal" reactor is treated in one or more reactors preferably adiabatic reactors.

Thus, when the target octane is that obtained and simply by the dehydrogenation of at least 85 percent of the naphthenes in the feed naphtha, the effluent of the "quasi-isothermal" reactor is the product reformate. For example, the 180°–380° F. E.P. fraction of Mid-Continent naphtha when reformed as described hereinbefore to dehydrogenate 85 percent of the naphthenes provides a $C_5+$ reformate having an octane rating (Research+3 cc. TEL) of about 93. On the other hand, when the product $C_5+$ reformate has a target octane rating (Research+3 cc. TEL) in excess of 93, the effluent of the "quasi-isothermal" reactor is contacted with about 10 to about 50 tons of platinum-group metal reforming catalyst per 10,000 barrels per day of naphtha in one or more reactors at the same, lower, or higher reforming reaction pressures. For example, the effluent of the "quasi-isothermal" reactor is contacted at about 200 p.s.i.g. with platinum-group metal reforming catalyst comprising about 0.6 percent by weight of platinum and about 0.7 percent by weight of chlorine on a support comprising alumina in one or more adiabatic reaction zones at a liquid hourly space velocity of 1.5 at a reforming temperature within the range of about 925° to 975° F. to produce a $C_5+$ reformate having an octane rating (Research+3 cc. TEL) of 104 from the aforedescribed 180° to 380° F. E.P. fraction of Mid-Continent naphtha.

On the other hand, the effluent of the "quasi-isothermal" reactor can be treated to separate the cyclic and branched chain paraffins from the normal paraffins and the separated normal paraffins treated in any manner to produce a blending stock having a required octane rating such that the rating of all of the refinery products when theoretically blended has the required "pool" octane.

In a reactor of similar construction an exothermic reaction such as the hydrogenation of an olefinic naphtha or the hydrodesulfurization and/or hydrodenitrogenation of a naphtha can be carried out. Thus, for a hydrogenation reaction carried out at 600° F. the temperature of the walls of the reaction tubes are kept at about 550° to about 575° F. Heat produced in the hydrogenation of the olefins or in the hydrogenation of the sulfur and/or nitrogen containing components of the feed is bled off into the gases produced by the combustion of the fuel at burners 28 through the heat transfer grids.

I claim:

1. A method of hydrocarbon treatment which comprises introducing into a confined reaction path, which is in direct heat transfer relation with fluid heat transfer medium, the total volume of a fluid stream comprising reactable hydrocarbon to pass through said confined reaction path, within said confined reaction path flowing the aforesaid total volume of said fluid stream successively through at least a first contact zone in contact with particle-form solid contact mass material therein, a first heat transfer zone in direct heat transfer relation with removable stationary strips of solid heat transfer medium, a second contact zone in contact with particle-form solid contact mass material therein, a second heat transfer zone in direct heat transfer relation with removable stationary strips of solid heat transfer medium, and a final contact zone in contact with particle-form solid contact mass material therein, and withdrawing reaction products from said confined reaction path at a temperature not more than twenty degrees to fifty degrees Fahrenheit different from the temperature of said fluid stream when introduced into said confined reaction path, the volume of particle-form solid contact mass material in said first contact zone being a minimum, the volume of particle-form solid contact mass material in succeeding contact zones increasing to a maximum in said final contact zone and being proportioned to provide substantially the same amount of reaction in each contact zone as measured by a substantially constant difference between the temperatures of the influent and the effluent streams of each contact zone, the strips of the aforesaid solid heat transfer medium in each heat transfer zone being of metal having a high coefficient of heat transfer, the strips of the aforesaid solid heat transfer medium being in indirect heat transfer relation with the aforesaid fluid heat transfer medium, and the area of the aforesaid strips of solid heat transfer medium in direct contact with said fluid stream in each of said heat transfer zones, the coefficient of heat conductance of the aforesaid solid heat transfer medium and the volume of said fluid stream being proportioned to transfer directly between said flowing stream and said solid heat transfer medium in each heat transfer zone substantially the same amount of heat energy to restore the temperature of the fluid stream leaving each of said heat transfer zones to substantially the temperature of the fluid stream entering the preceding contact zone.

2. The method of catalytic hydrocarbon conversion set forth and described in claim 1 wherein the reactable component of the fluid stream is at least one naphthene, wherein the particle-form solid contact mass material is a dehydrogenating catalyst capable of dehydrogenating naphthenes to aromatics, and wherein the temperature differential in each of the plurality of static beds between the temperature of the fluid stream entering and leaving each of the aforesaid plurality of static beds is not greater than about ten degrees Fahrenheit.

3. The method of catalytic hydrocarbon conversion set forth and described in claim 1 wherein the reactable component of the fluid stream is at least one naphthene, wherein the particle-form solid catalytic material is reforming catalyst comprising 0.1 to 2.0 percent by weight platinum on refractory oxide support, and wherein the amount of particle-form solid catalytic material in each static bed increases from the lead bed to the tail bed in accordance with the equation (1)
$$W = \frac{L K_p N_t C_p \Delta T}{K_f P_n \left[ K_p - \frac{(P_a P_{H_2}^3)}{P_n} \right] H_R}$$

where:

$L$=mols fresh feed per hour;
$K_p$=equilibrium constant for naphthene⇌aromatic equilibrium in atmospheres to the third power (atm.³);
$K_f$=rate constant for naphthene dehydrogenation $$\frac{\text{mols}}{\text{(hour) (lb. catalyst) (atm.)}}$$

$N_t$=total mols per mol fresh feed=recycle ratio+1;
$P_n$=partial pressure of naphthenes, atmospheres;
$P_a$=partial pressure of aromatics, atmospheres;
$P_{H_2}$=partial pressure of hydrogen, atmospheres;
$H_r$=heat of reaction, B.t.u. per pound mol of naphthene;
$C_p$=molar heat capacity, B.t.u. per pound mol, per ° F.;
$W$=pounds of catalyst in catalyst section;
$\Delta T$=decrease in temperature in section, ° F.

4. In a quasi-isothermal reactor for hydrocarbon conversion which comprises a cylindrical container, a source of fluid heat transfer medium within said container, a plurality of vertical reaction tubes disposed within said container in a plurality of circles concentric with the aforesaid source of fluid heat transfer medium, the vertical reaction tubes in the outer of said concentric circles being adjacent the wall of the aforesaid container, none of said vertical reaction tubes in the inner circles being interposed substantially between the aforesaid source of fluid heat transfer medium and another vertical reaction tube, inlet means for introducing fluid stream containing at least one reactable component into each vertical reaction tube, outlet means for withdrawing a fluid stream from each vertical reaction tube, the improvement which comprises a plurality, consisting at least of a lead, a tail, and intermediate, of vertically spaced apart stationary heat transfer grids consisting of solid heat transfer medium movably mounted in each of the aforesaid vertical reaction tubes, said lead stationary heat transfer grid being spaced apart from said inlet means, and said tail stationary heat transfer grid being spaced apart from said outlet means, all of said stationary heat transfer grids being in direct heat transfer relation only with the contiguous inner periphery of a vertical reaction tube, each of said stationary heat transfer grids having substantially the same area of heat transfer surface for contact with the aforesaid fluid stream in direct heat transfer relation, the space between successive stationary heat transfer grids increasing from said lead stationary heat transfer grid to said tail stationary heat transfer grid and the greatest space being between the aforesaid tail stationary heat transfer grids and the aforesaid outlet means, the space between the aforesaid lead stationary heat transfer grid and said inlet means, the space between successive stationary heat transfer grids, and the space between said tail stationary heat transfer grid and the aforesaid outlet forming catalyst zones of increasing capacity for particle-form solid hycarbon conversion catalytic material wherein reaction of the aforesaid reactable component takes place to require transfer of substantially the same amount of heat energy between successive catalyst zones between said fluid stream and said stationary heat transfer grids, a fluid stream pervious but catalyst particle retaining partition mounted horizontally on the lead side of each stationary heat transfer means, and means mounted on the lead side of each stationary heat transfer grid adapted to facilitate removing said stationary heat transfer grid from said vertical reaction tube.

5. A quasi-isothermal reactor for hydrocarbon conversion as set forth and described in claim 4 wherein the stationary heat transfer grids each comprises a grid of sheets of metal having a melting point higher than 1000° F.

6. A quasi-isothermal reactor for hydrocarbon conversion as set forth and described in claim 4 wherein the stationary heat transfer grids are each a honeycomb of sheets of metal having a melting point above 1000° F.

7. The hydrocarbon treatment set forth in claim 1 wherein the reactable hydrocarbon comprises naphthenes and paraffins, wherein the particle-form solid contact mass material is platinum-group metal reforming catalyst, and wherein the reaction product is separated into (1) cyclic hydrocarbons and isoparaffinic hydrocarbons and (2) normal paraffinic hydrocarbons.

8. The hydrocarbon treatment set forth in claim 1 wherein the reactable hydrocarbon comprises naphthenes and paraffins, wherein the particle-form solid contact mass material is platinum-group metal reforming catalyst, wherein the reaction product is separated into (1) cyclic hydrocarbons, (2) isoparaffinic hydrocarbons, and (3) normal paraffinic hydrocarbons, and wherein at least a portion of said separated normal paraffinic hydrocarbons is converted into hydrocarbons boiling in the gasoline range having a higher octane rating than said normal paraffinic hydrocarbons.

References Cited by the Examiner
UNITED STATES PATENTS

| | | | |
|---|---|---|---|
| 1,995,768 | 3/35 | Fesenmaier | 165—157 |
| 2,142,678 | 1/39 | Porter | 23—288.82 |
| 2,173,984 | 9/39 | Shapleigh | 23—212 |
| 2,198,555 | 4/40 | Wilson et al. | 23—288.92 |
| 2,271,646 | 2/42 | Kassel | 208—146 |
| 2,299,197 | 10/42 | West | 23—288.9 |
| 2,306,011 | 12/42 | Burk et al. | 23—288.91 |
| 2,311,318 | 2/43 | Tyson et al. | 208—74 |
| 2,361,020 | 10/44 | Gibb | 23—288.92 |
| 2,363,874 | 11/44 | Krebs | 208—147 |
| 2,366,567 | 1/45 | Shultz | 208—146 |
| 2,573,149 | 10/51 | Kassel | 260—683.3 |
| 2,577,124 | 12/51 | Newcomer | 257—128 |
| 2,704,741 | 3/55 | Thayer | 208—147 |
| 2,793,835 | 5/57 | Woods | 257—128 |
| 2,875,150 | 2/59 | Schuman | 208—147 |
| 2,894,826 | 7/59 | Stengel | 23—288.92 |
| 2,943,998 | 7/60 | Decker | 208—65 |

ALPHONSO D. SULLIVAN, *Primary Examiner.*

JOSEPH R. LIBERMAN, *Examiner.*

UNITED STATES PATENT OFFICE
CERTIFICATE OF CORRECTION

Patent No. 3,198,727                August 3, 1965

Philip P. Lifland

It is hereby certified that error appears in the above numbered patent requiring correction and that the said Letters Patent should read as corrected below.

Column 1, line 37, strike out "in", second occurrence; column 2, line 29, after "bed" insert -- of --; column 4, line 52, after "that" insert -- the --; column 7, line 9, for "$H_t$" read -- $H_r$ --; same column 7, second table, second column, line 14 thereof, for "0.0431" read -- 0.0441 --; column 9, line 33, for "7" read -- 5 --; column 10, line 57, for "other" read -- outer --; line 69, after "thenes" insert a comma; column 11, line 1, strike out "and".

Signed and sealed this 18th day of January 1966.

(SEAL)
Attest:

ERNEST W. SWIDER
Attesting Officer

EDWARD J. BRENNER
Commissioner of Patents